(12) United States Patent
Thumparthy (10) Patent No.: US 9,565,556 B2
(45) Date of Patent: Feb. 7, 2017

(54) USER MANAGED NUMBER PRIVACY AND CALL ACCESSIBILITY

(76) Inventor: Viswanatha Rao Thumparthy, Bangalore (IN)

( * ) Notice: Subject to any disclaimer, the term of this patent is extended or adjusted under 35 U.S.C. 154(b) by 1084 days.

(21) Appl. No.: 13/536,020

(22) Filed: Jun. 28, 2012

(65) Prior Publication Data
US 2013/0259229 A1    Oct. 3, 2013

(30) Foreign Application Priority Data
Apr. 2, 2012   (IN) ............................ 1308/CHE/2012

(51) Int. Cl.
*H04K 1/00* (2006.01)
*H04W 12/02* (2009.01)

(52) U.S. Cl.
CPC ..... *H04W 12/02* (2013.01); *H04M 2203/6009* (2013.01)

(58) Field of Classification Search
CPC ...................... H04M 2203/6009; H04W 12/02
See application file for complete search history.

(56) References Cited

U.S. PATENT DOCUMENTS

| | | | | |
|---|---|---|---|---|
| 5,289,542 A * | 2/1994 | Kessler | | 380/257 |
| 6,553,109 B1 * | 4/2003 | Hussain | | H04M 3/436 |
| | | | | 379/142.05 |
| 7,839,987 B1 * | 11/2010 | Kirchhoff et al. | | 379/142.02 |
| 8,364,154 B1 * | 1/2013 | Raghunath | | H04M 3/42229 |
| | | | | 370/310.2 |
| 2002/0193096 A1 * | 12/2002 | Dwyer | | H04L 51/38 |
| | | | | 455/412.1 |
| 2003/0056096 A1 * | 3/2003 | Albert et al. | | 713/168 |
| 2005/0018849 A1 * | 1/2005 | Rodriguez | | H04L 63/0407 |
| | | | | 380/257 |
| 2005/0047575 A1 * | 3/2005 | Parker et al. | | 379/211.02 |
| 2006/0046720 A1 * | 3/2006 | Toropainen et al. | | 455/434 |
| 2007/0121863 A1 * | 5/2007 | Nagel et al. | | 379/161 |
| 2009/0144068 A1 * | 6/2009 | Altberg et al. | | 705/1 |
| 2011/0082727 A1 * | 4/2011 | Macias | | 705/14.4 |
| 2012/0030623 A1 * | 2/2012 | Hoellwarth | | 715/811 |
| 2012/0185495 A1 * | 7/2012 | Lim et al. | | 707/758 |
| 2013/0005255 A1 * | 1/2013 | Pering et al. | | 455/41.2 |

OTHER PUBLICATIONS

Carlson, "Answers to 15 Google Interview Questions That Will Make You Feel Stupid", pp. 1-15, https://web.archive.org/web/20110216044634/http://www.businessinsider.com/answers-to-15-google-interview-questions-that-will-make-you-feel-stupid-2010-11, Pub. Date: Feb. 2011.*

* cited by examiner

*Primary Examiner* — Krista Zele
*Assistant Examiner* — James Forman (57) ABSTRACT

A system and method for maintaining privacy of a user's telephone number is disclosed. The method provides a means by which a user A may prefer to exchange her contact number with another user B. The contact number is encrypted by user A and passed on to the mobile phone of user B. In the phonebook of user B, the contact number of user A is stored in encrypted format. Further, when user B initiates a call to user A, the encrypted number is sent to the network. At the MSC of user B, the number is decrypted and a call is established with user A. When user A calls user B, user A's number is encrypted at user B's MSC. This is transmitted to user B, where it is compared with the already encrypted number in the phonebook. The matching name of user A is then displayed.

10 Claims, 5 Drawing Sheets

USER MANAGED NUMBER PRIVACY AND CALL ACCESSIBILITY

This application claims priority from Indian application 1308/CHE/2012 titled "USER MANAGED NUMBER PRIVACY AND CALL ACCESSIBILITY" and filed on 2 Apr. 2012.

TECHNICAL FIELD

The embodiments herein relate to communication networks and, more particularly, to maintaining number privacy in communication networks.

BACKGROUND

Currently, users of the communication networks receive unsolicited calls. These unsolicited calls are a result of the phone numbers being publicly available, either by the user herself or by some other person/organization that is privy to the user's number sharing it with others. Once the phone number has been shared with any person or organization, the phone number becomes public knowledge. Organizations with which a user shares her mobile number could, perhaps, be prevented from sharing the knowledge further by enacting and enforcing privacy laws. In spite of this, there are many instances of organizations sharing their databases with marketing companies, for a fee. Preventing transfer of numbers between persons is even more difficult. Other than being a source of bother for the users, the unsolicited calls also load the communication network, due to activities such as telemarketing.

There are some solutions to avoiding unsolicited phone calls such as barring the calls from chosen numbers. After receiving the first unsolicited call and determining that the other party is a source of unsolicited calls, the user could bar the call at the operator network level. However, the user will still receive many such first calls. Also, this will still result in a load on the network operator, as the calls are initiated, but are only not delivered by the network to the user.

Another option available to the user is the user being selective in sharing her phone number. However, this is not a practical option for the user, as she may still need to share the number with some people or entities to receive some information. The need is to control the passing on of the same to others. Not sharing the number will result in the user missing out on information from useful sources such as her bank.

A further option available to the user is to change the number when the traffic of unsolicited calls on that number becomes high. But, the user once again has to distribute the new number to the contacts of interest, which is cumbersome.

Due to the aforementioned reasons there is a need for an effective mechanism that helps in preserving privacy of the user's telephone number while providing uninhibited sharing.

SUMMARY

In view of the foregoing, an embodiment herein provides a system for providing number privacy in a communication network. The system comprises at least one mobile switching center and at least two users with mobile phones and the mobiles phones belong to the same service provider. The system comprising the steps of identifying a public key encryption algorithm and an associated pair of public and private keys by the service provider, encrypting the number of the first mobile phone using the public key of the service provider, by the first mobile phone, sending name and the encrypted number to a second mobile phone through a connectivity means, storing the name and the encrypted number on the second mobile phone's phonebook, initiating a call from the second mobile phone to the first mobile phone using the name and transmitting the encrypted number to the network, decrypting the encrypted number at the mobile switching center of the second mobile phone using the private key of the service provider and connecting to the first mobile phone using the decrypted number. Further, the system, when the first mobile initiates a call to the second mobile phone, comprises encrypting the number of the first mobile phone at the mobile switching center of the second mobile phone, transmitting the encrypted number to the second mobile phone, searching the phonebook of second mobile phone using the encrypted number of first mobile phone and displaying name of the first mobile phone after a match occurs. Further, the system comprises establishing a common algorithm and pair of keys when operation across multiple service providers is required.

The embodiment herein also provides a method for providing number privacy in a communication network. The network comprising at least one mobile switching center and at least two users with mobile phones, wherein the mobiles phones belong to the same service provider. Further, the method comprising steps of identifying a public key encryption algorithm and an associated pair of public and private keys by the service provider, encrypting the number of the first mobile phone using the public key of the service provider, by the first mobile phone, sending name and the encrypted number to a second mobile phone through a connectivity means, storing the name and the encrypted number on the second mobile phone's phonebook, initiating a call from the second mobile phone to the first mobile phone using the name and transmitting the encrypted number to the network, decrypting the encrypted number at the mobile switching center of the second mobile phone using the private key of the service provider and connecting to the first mobile phone using the decrypted number. Further, the method, when the first mobile initiates a call to the second mobile phone, comprises encrypting the number of the first mobile phone at the mobile switching center of the second mobile phone, transmitting the encrypted number to the second mobile phone, searching the phonebook of second mobile phone using the encrypted number of first mobile phone and displaying name of the first mobile phone after a match occurs. Further, the method comprises establishing a common algorithm and pair of keys when operation across multiple service providers is required.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice similar embodiments. Accordingly, the examples should not be construed as limiting the scope of the embodiments herein.

The embodiments herein disclose a mechanism by which a user could maintain privacy of her number and control the 'caller' space to her phone. Referring now to the drawings, and more particularly to FIGS. 1 through 5, where similar reference characters denote corresponding features consistently throughout the figures, there are shown embodiments.

In an embodiment herein, the terms mobile phone or cell phone may be used interchangeably.

A system and method for maintaining privacy of a user's telephone number is disclosed. In an embodiment, the telephone number may be her mobile phone number, landline number and the like, where the phone has a facility such as a phonebook, to store numbers. The method provides a means by which a user A may prefer to exchange her contact number with another user B in a private manner. This is achieved by encrypting the number with the network's public key and exchanging the encrypted result. The encrypted number is passed on to the mobile phone of user B by means of any connectivity medium, such as Bluetooth or WiFi, common to both the users. In the phonebook of user B, the contact number of user A is stored in encrypted format. Due to this, the display of the actual contact number of user A is not available to user B. Further, when user B initiates a call to user A the encrypted number is sent to the network. At the MSC of user A, the number is decrypted, the actual number retrieved and a call is established with user A. In no instance the actual contact number of user A is available to user B. This ensures that the privacy of the contact number of user A is maintained; user B does not know the actual number to pass on to any other person or entity.

Figure 1:
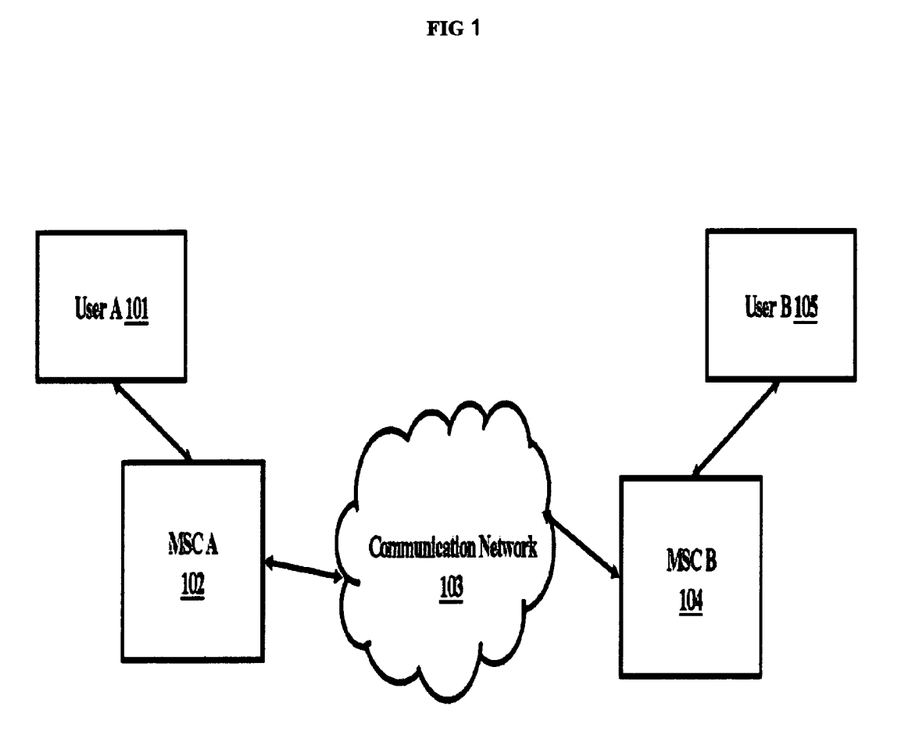
FIG. 1 illustrates architecture of the system, as disclosed in the embodiments herein.

FIG. 1 illustrates the architecture of the system, as disclosed in the embodiments herein. As depicted it is a basic architecture of the system, however the application does not aim to limit the network elements to the ones disclosed herein. The architecture comprises a user A 101, Mobile Switching Center (MSC) 102 of user A's network, communication network 103, Mobile Switching Center (MSC) 104 of user B's network and user B 105.

The user A 101 and user B 105 may comprise of a user of a cell phone, satellite phone and the like. The user A 101 may have registered for the number privacy service with the respective service provider. In an embodiment, the user A 101 and user B 105 may be belonging to a same service provider or a different service provider.

The MSC A 102 is responsible for receiving and forwarding call initiation requests, messaging requests and so on from various users of the wireless service. The MSC A 102 is the mobile switching center of user A 101.

The communication network 103 acts as a means of transport of the communication payloads between the users of the wireless service, such as user A 101 and user B 104. The communication network 103 may be a wireless network, wired network, 3G network, Next generation network and so on.

MSC A 102 is responsible for receiving and forwarding call initiation requests, messaging requests from various users of the wireless service, in a different geographical area. On similar lines as MSC A 102 the MSC B 104 is the switching center of user B 105.

Figure 2:
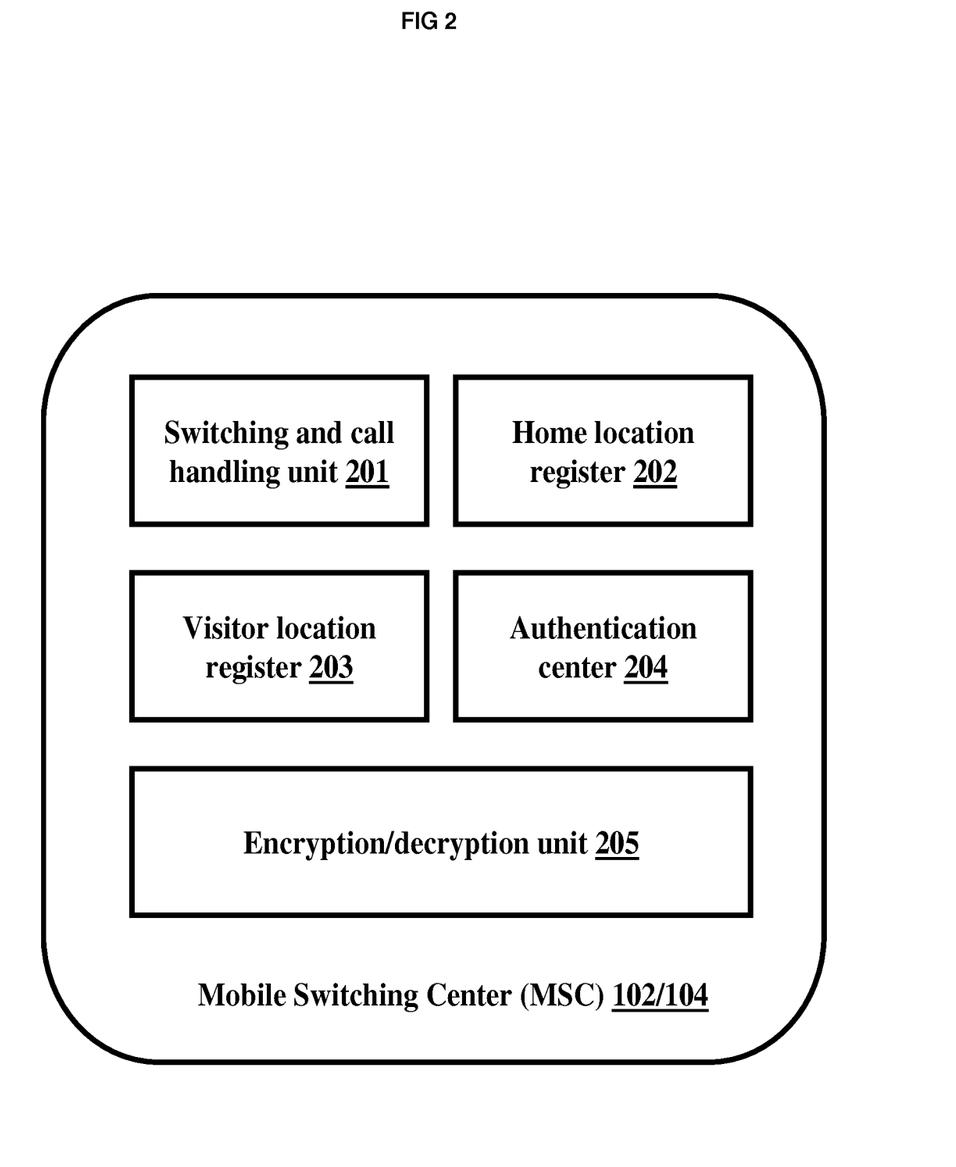
FIG. 2 illustrates a block diagram of the Mobile Switching Center (MSC), as disclosed in the embodiments herein.

FIG. 2 illustrates a block diagram of the Mobile Switching Center (MSC), as disclosed in the embodiments herein. The MSC 102/104 comprises of several modules or units that assist in the functioning of the MSC 102/104. The modules include a switching and call handling unit 201, a Home Location Register (HLR) 202, a Visitor Location Register (VLR) 203, an Authentication center 204, and an encryption/decryption unit 205. Modules 201 to 204 perform functions similar to similarly named modules in wireless networks such as GSM, GPRS or 3G. For brevity of description, these modules are not detailed here, as the application disclosed herein does not alter the functionalities of these modules.

The encryption/decryption unit 205 is an additional module with respect to this application. It is responsible for certain cryptographic functions that are required for implementing the number privacy service. The operations performed by this module are detailed in the description of the next figures.

In an embodiment, the MSC may also be provided with a trusted third party Security Access Module (SAM) which performs the cryptographic functions that are required for implementing the number privacy service.

Figure 3:
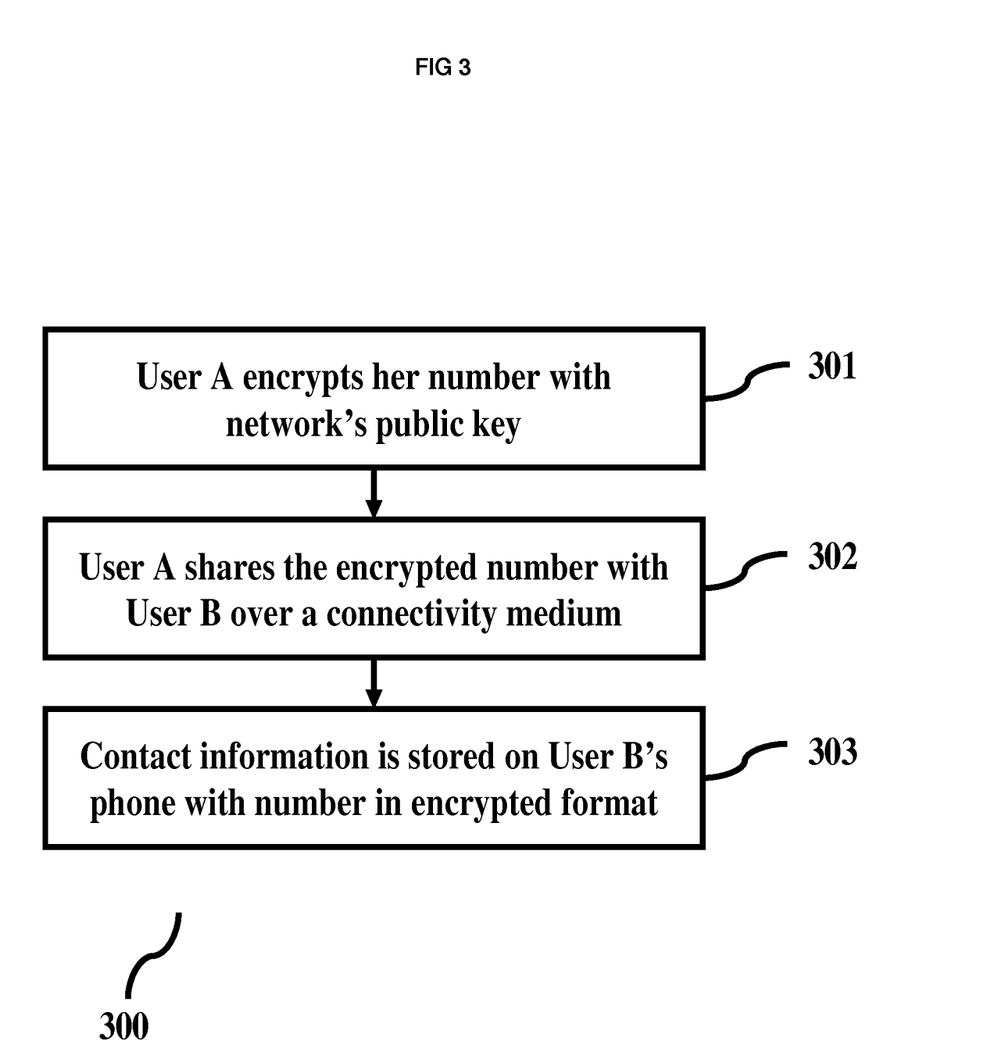
FIG. 3 is a flow diagram illustrating the method of sharing a phone number between two users, with privacy feature, as disclosed in the embodiments herein.

FIG. 3 is a flow diagram illustrating the method of sharing a phone number between two users, with privacy feature, as disclosed in the embodiments herein. In the embodiment herein, user A 101 is registered for the number privacy service and wishes to share (301) her contact number with another user B 105. User A encrypts her number with the public key of her home network, as per any public key encryption algorithm. User A 101 shares (302) her contact details with user B 105 by initiating a connectivity session through her phonebook application. In an embodiment, the connectivity may be initiated by a means such as Bluetooth, Wi-fi, Infrared connection and so on. Once she selects to transfer her contact details her name in the clear and the number, in encrypted form, are transmitted to user B. For the purpose of encryption, the service provider will be equipped with a public key and private key, as per the requirements of any well-known public key algorithm. Let KSPpri and KSPpub be private key and public key, respectively, of the service provider. User A encrypts her contact phone number using KSPpub. If user A's 101 phone number is N1, then the result of encryption will be E(KSPpub(N1)), where E(x) stands for encryption with key x. The name and encrypted number are stored (303) in the phonebook of user B 105. The user B 105 will be able to initiate calls and connections to user A 101 by selecting the name and placing a call. However; she will not get to know the actual number of user A 101, as it is stored in encrypted form, E(KSPpub(N1)), and not as N1. In an embodiment, the encrypted number may not even be displayed in the phonebook.

Figure 4:
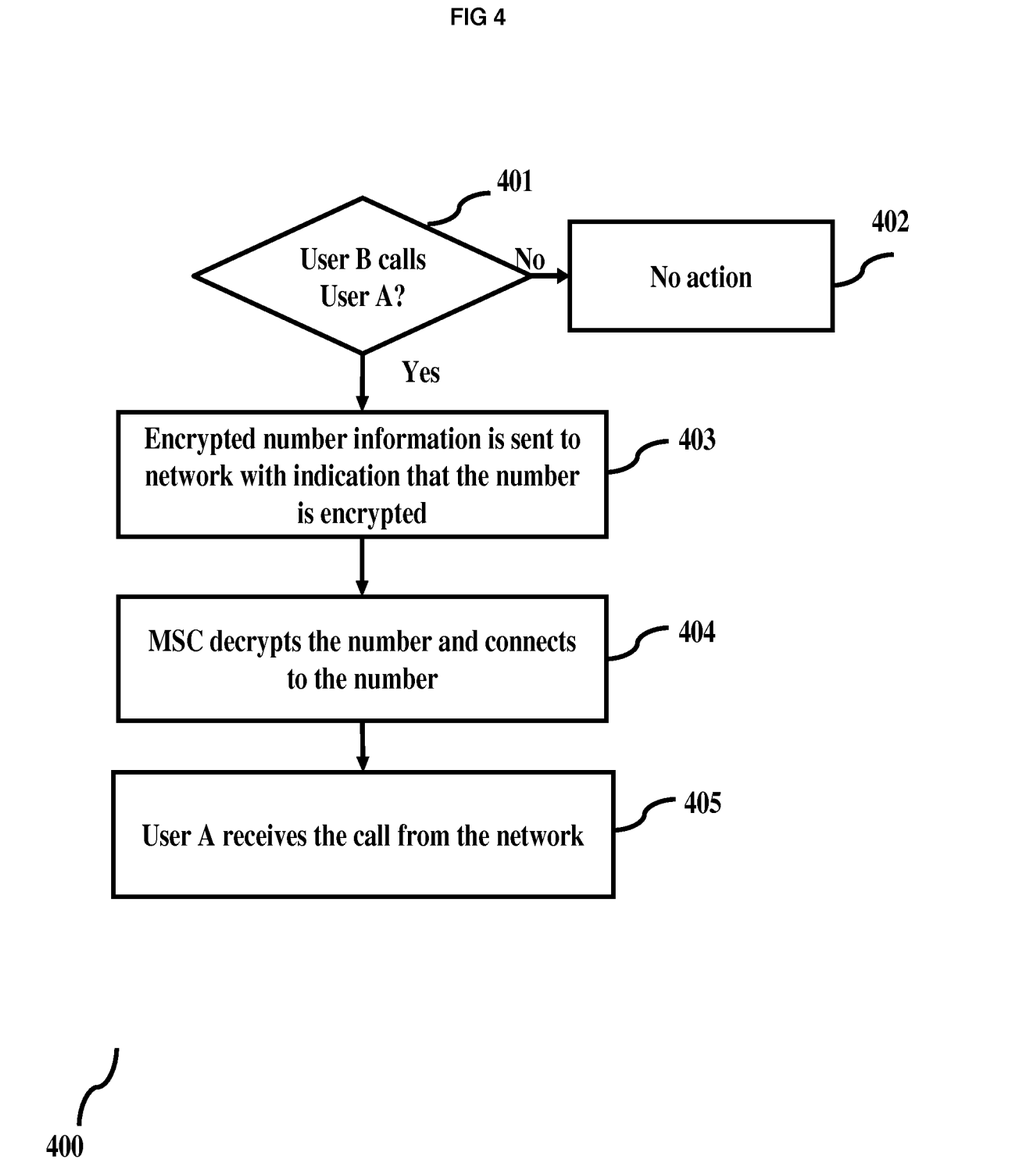
FIG. 4 is a flow diagram illustrating the method of placing a call from user B, who has received a number with privacy feature to user A, who has shared the number with privacy feature, as disclosed in the embodiments herein.

FIG. 4 is a flow diagram illustrating the method of placing a call from user B, who has received a number with privacy feature to user A, who has shared the number with privacy feature, as disclosed in the embodiments herein. When user B 105 wishes to initiate a call to user A 101 she searches her phonebook. On her phonebook the name of user A 101 is displayed with the number either being displayed in encrypted form or not being displayed at all. A check is made for call initiation (401). If not, then no action is taken (402). If yes, then the encrypted number in the phonebook of user B 105 is passed (403) to the network. In an embodiment, the number may be sent in the SETUP message, with an indication that it is an encrypted number. For instance, this could be done by mentioning the numbering system of the called party number as following a 'reserved' type number, as specified by the GSM standard 04-08 V7.21.0, sections 9.3.23 and 10.5.4.7. At the network side, the MSC B 104 decrypts (404) the number and sends it to the network for connection. The encrypted number may be decrypted using its private key, at the MSC B encryption/decryption unit 205, before connecting with the called party. In an embodiment, MSC A and MSC B belong to the same service provider. Hence, the private key of the service provider is known to all the MSCs. As KSPpri is the private key of the service provider, then D(KSPpri(E(KSPpub(N1))))=N1, where D(x) stands for decryption with key x. On successful decryption, the call is set up with user A 101 (405) without disclosing her number at user B's 105 mobile phone.

In another embodiment, MSC A and MSC B belong to different service providers. In this case, the service providers have to agree on a common pair of public and private keys to use for communications between them. In an embodiment, a third-party could provide this common key pair and also the encryption/decryption unit to both the service providers. Thus, the private and public keys could be named KTPpri and KTPpub, respectively, and would be used by both the service providers for the number privacy feature, in place of KSPpri and KSPpub, as described in the above paragraphs. Further, the third-party based encryption/decryption mechanism also works for more than two service providers. The various actions in method 400 may be performed in the order presented, in a different order or simultaneously. Further, in some embodiments, some actions listed in FIG. 4 may be omitted.

Figure 5:
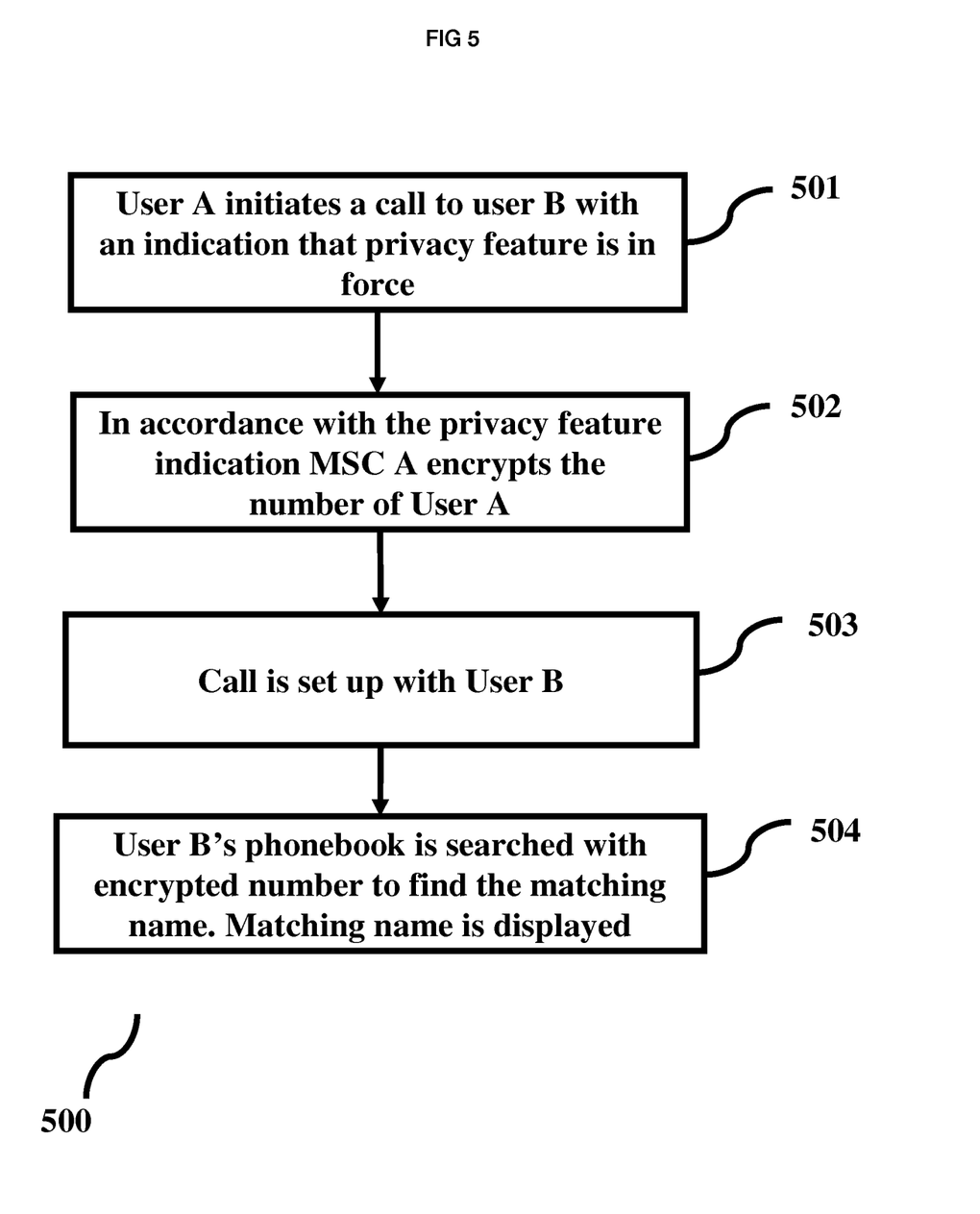
FIG. 5 is a flow diagram illustrating the initiation of a call from a user A to user B, where user A has shared the number with privacy feature, with user B, as disclosed in the embodiments herein.

FIG. 5 is a flow diagram illustrating the initiation of a call from a user A to user B, where user A has shared the number with privacy feature, with user B, as disclosed in the embodiments herein. Consider user A 101 is registered for the number privacy service and has exchanged her number with user B 105. User A 101 may want to initiate a call to user B. For the privacy feature to be complete, user A's number should not get displayed at user B's 105 phone. Only the name of user A 101 should be displayed on user B's 105 phone. In this case, when user A 101 makes a call request, the request is sent (501) to the network with an indication that number privacy feature is in force for this call. In an embodiment, this could be done in the SETUP message. The calling party sub-address information element, which is optional, may be used for notification to the network. This information element has some reserved bits which could be used for this indication. In an embodiment, MSC A and MSC B may belong to the same service provider. In this case, MSC B 104 at the network level may use this indication to encrypt (502) the calling party number using KSPpub and passes on the encrypted number to user B 105 when connecting. The call is set up (503) to user B 105. At user B's 105 end the encrypted calling party number is compared (504) with number entries in the phonebook. This will match with user A's name and this will be displayed.

In another embodiment, MSC A and MSC B may belong to different service providers. In this case, the service providers have to agree on a common pair of public and private keys to use for communications between them. In an embodiment, a third-party could provide this common key pair and also the encryption/decryption unit to both the service providers. Thus, the private and public keys could be named KTPpri and KTPpub, respectively, and would be used by both the service providers for the number privacy feature, in place of KSPpri and KSPpub, as described in the above paragraphs. Further, the third-party based encryption/decryption mechanism also works for more than two service providers. The various actions in method 500 may be performed in the order presented, in a different order or simultaneously. Further, in some embodiments, some actions listed in FIG. 5 may be omitted.

In an embodiment, the method allows complete security to mobile number of user A 101 and user B's 105 mobile never encounters actual number (say N1 of user A), in the clear, in the complete cycle of call handling, whether user B calls user A or vice versa. The only way for user B 105 to obtain N1 would be to obtain KSPpri, which could be secured by the service provider.

In an embodiment, assume user B 105 obtains the encrypted number of user A, E(KSPpub(N1)), and passes it on, orally, through SMS, or otherwise, to another user. The new user may enter it into her phonebook or use it directly to call user A. However, a call such as this would assume the called party number to be following a service provider's standard numbers, i.e., the of number would not be associated with number privacy feature. Hence the number would not be decrypted at the MSC and the MSC would, in all probability, find the number to be invalid. The control suggested here is that only the numbers exchanged explicitly by user A, through a connectivity session of the phonebook, as described above, should be marked as following the number privacy feature. This could be replaced by any other 'trusted' method such as registering through an operator administration application.

In an embodiment, user B 105 will not be able to pass on user A 101 number in her phonebook to another user, through a connectivity session, as the phonebook application may prevent such action.

In an embodiment, it could be argued that the phonebook application could be hacked and user A's entry could be copied bit-exact from user B's device to a third device. While this is not impossible, the barrier for this is high. Also, parallel developments are taking place in groups such as the TCG (Trusted Computing Group) which will allow the user as well as the service provider to detect devices that are not running trusted applications.

Use Case:
Limiting the Number of Calls

In an embodiment, the communication of user A's 101 number could be augmented with information limiting the number of calls that user B 105 is allowed. Beyond this limit, the entry of user A's 101 number in user B's phonebook will be automatically deleted. An alerting message could be sent to user A 101 informing about this. User A 101 could respond to this by extending the access for some more calls or provide unconditional access. This feature is especially useful for user A to gain trust in user B before extending call access.

Limiting the Time of Calls

In an embodiment, the system could also be used to specify the times during which the calls would be accepted by user A 101. The access could also be specified by number of days also, i.e., user B 105 would be allowed to call within the specified number of days. This feature is useful in situations where user A 101 and user B 105 are in a time-bound transaction. Beyond this time limit, the entry for user A 101 in user B's phonebook will be automatically deleted. As in the previous section, an alert could be provided to user A 101, on the last day, for extending the access.

Limiting the Duration of Calls

In an embodiment, the access could also be limited by the cumulative amount of time user B 105 could communicate with user A 101. This will be a very useful feature where a paid service is being provided by user A 101 to user B 104. Beyond this cumulative duration, the entry for user A 101 in user B's 105 phonebook will be automatically deleted. Further, an alert could be provided to user A 101, when a watermark is reached, for extending the access. The auto expiry feature in all the above scenarios allows user A 101 to share her number freely, enabling him to receive 'pushed' information and continuing channels that are productive.

The embodiments disclosed herein can be implemented through at least one software program running on at least one hardware device and performing network management functions to control the network elements. The network elements shown in FIGS. 1 and 2 include blocks which can be at least one of a hardware device, or a combination of hardware device and software module.

The embodiment disclosed herein specifies a system for sharing of telephone numbers in such way that they cannot be shared further. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in, for e.g., Very high speed integrated circuit Hardware Description Language (VHDL), another programming language, or implemented by one or more VHDL or several software modules being executed on at least one hardware device. The hardware device can be any kind of device which can be programmed including, for e.g., any kind of computer like a server or a personal computer, or the like, or any combination thereof, for e.g., one processor and two FPGAs. The device may also include means which could be, for e.g., hardware means like, for e.g., an ASIC, or a combination of hardware and software means, for e.g., an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the application may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

I claim:

1. A system for providing number privacy in a communication network, said system comprising at least one mobile switching center and at least two users with mobile phones, wherein said mobiles phones belong to the same service provider or different service providers, further said system comprising:

registering, by a first mobile phone, with a service provider for a number privacy service;

sending, by a first mobile phone, a name and an encrypted number with a privacy feature indication to a second mobile phone through a connectivity means, whereby the actual number of the first mobile phone is not available to the second mobile phone;

initiating a call from said second mobile phone to said first mobile phone using said name and transmitting said encrypted number with said privacy feature indication to said communication network;

initiating a call from said first mobile phone to said second mobile phone, by transmitting a privacy feature indication to said communication network, to enable said communication network to encrypt the number of the first mobile phone, before transmitting to said second mobile phone, whereby the actual number of the first mobile phone is not made available to the second mobile phone; and wherein when a user of said second mobile phone passes said encrypted number of said first mobile phone to another user, said encrypted number of said first mobile phone is transferred, but not associated with said privacy feature indication, to a mobile phone of said another user, whereby a call initiated by said another user to the first mobile phone using the encrypted number is not established since said encrypted number of said first mobile phone is not associated with said privacy feature indication.

2. The system as in claim 1, wherein said first mobile phone is configured to place a limit on the number of days after which said encrypted number in a phonebook of said second mobile phone is automatically deleted.

3. The system as in claim 1, wherein said first mobile phone is configured to place a limit on the number of calls that the said second mobile phone could make to the said first mobile phone.

4. The system as in claim 1, wherein said first mobile phone is configured to place a limit on the talk time that the said second mobile phone could use with the said first mobile phone.

5. The system as in claim 1, wherein said another user is able to initiate a call to said first mobile device if the user of the first mobile phone explicitly exchanges the encrypted number of said first mobile phone along with the privacy feature indication, with said another user.

6. A method for providing number privacy in a communication network, said communication network comprising at least one mobile switching center and at least two users with mobile phones, wherein said mobiles phones belong to the same service provider or different service providers, further said method comprising:

registering, by a first mobile phone, with a service provider for a number privacy service;

sending, by a first mobile phone, a name and an encrypted number with a privacy feature indication to a second mobile phone through a connectivity means, whereby the actual number of the first mobile phone is not available to the second mobile phone;

initiating a call from said second mobile phone to said first mobile phone using said name and transmitting said encrypted number with said privacy feature indication to said communication network;

initiating a call from said first mobile phone to said second mobile phone, by transmitting a privacy feature indication to said communication network, to enable said communication network to encrypt the number of the first mobile phone, before transmitting to said second mobile phone, whereby the actual number of the first mobile phone is not made available to the second mobile phone; and wherein when a user of said second mobile phone passes said encrypted number of said first mobile phone to another user, said encrypted number of said first mobile phone is transferred, but not associated with said privacy feature indication, to a mobile phone of said another user, whereby a call initiated by said another user to the first mobile phone using the encrypted number is not established since said encrypted number of said first mobile phone is not associated with said privacy feature indication.

7. The method as in claim 6, wherein said method comprising said first mobile phone placing a limit on the number of days after which said encrypted number in a phonebook of said second mobile phone is automatically deleted.

8. The method as in claim 6, wherein said method comprising said first mobile phone placing a limit on the number of calls that the said second mobile phone could make to the said first mobile phone.

9. The method as in claim 6, wherein said method comprising said first mobile phone placing a limit on the talk time that the said second mobile phone could use with the said first mobile phone.

10. The method as in claim 6, wherein said another user is able to initiate a call to said first mobile device if the user of the first mobile phone explicitly exchanges the encrypted number of said first mobile phone along with the privacy feature indication, with said another user.

* * * * *